July 6, 1926.

G. DUMONT

AUTOMOBILE CHASSIS

Filed Nov. 14, 1922

Inventor
G. Dumont
by Langner, Parry, Card & Langner
Attys

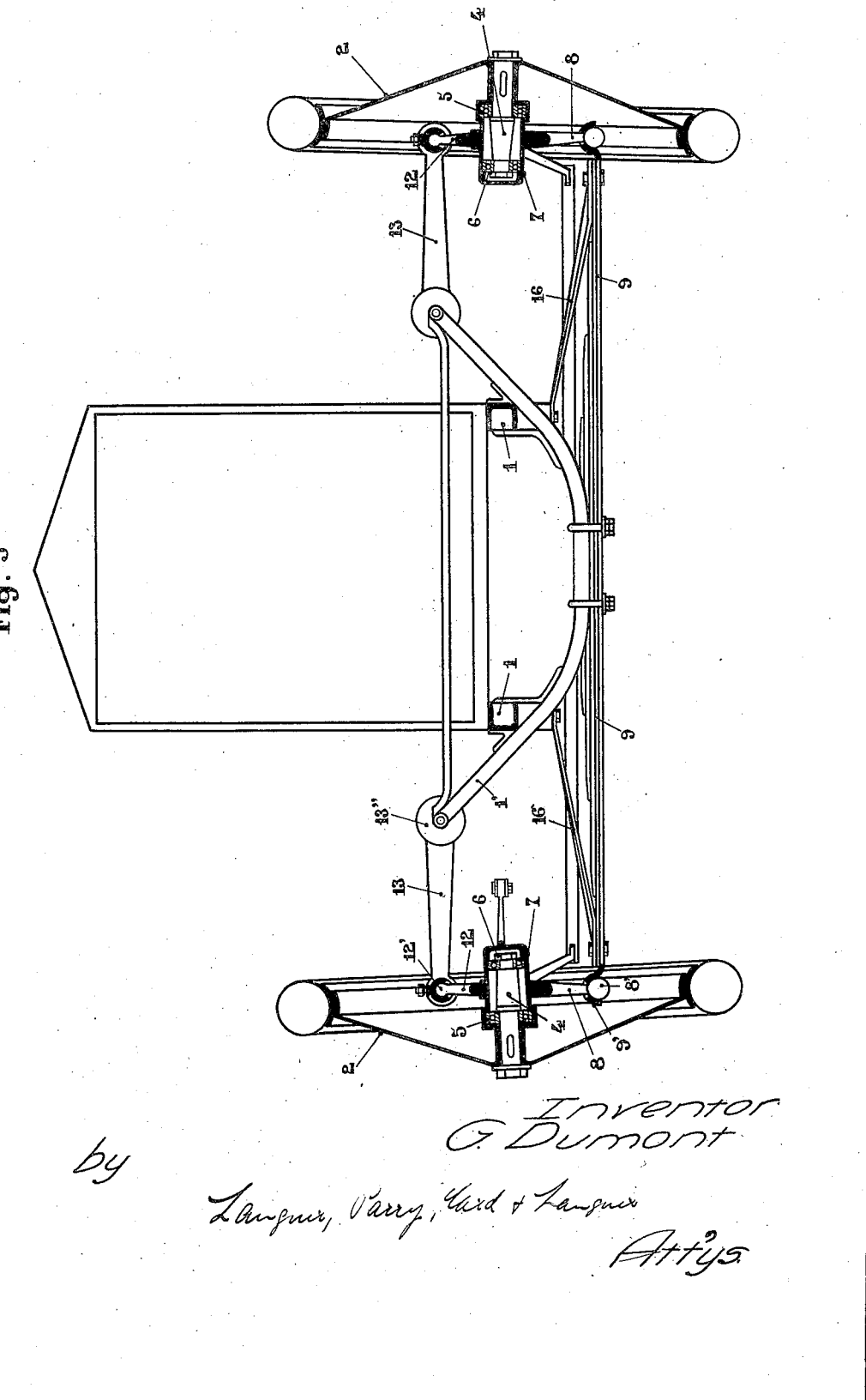

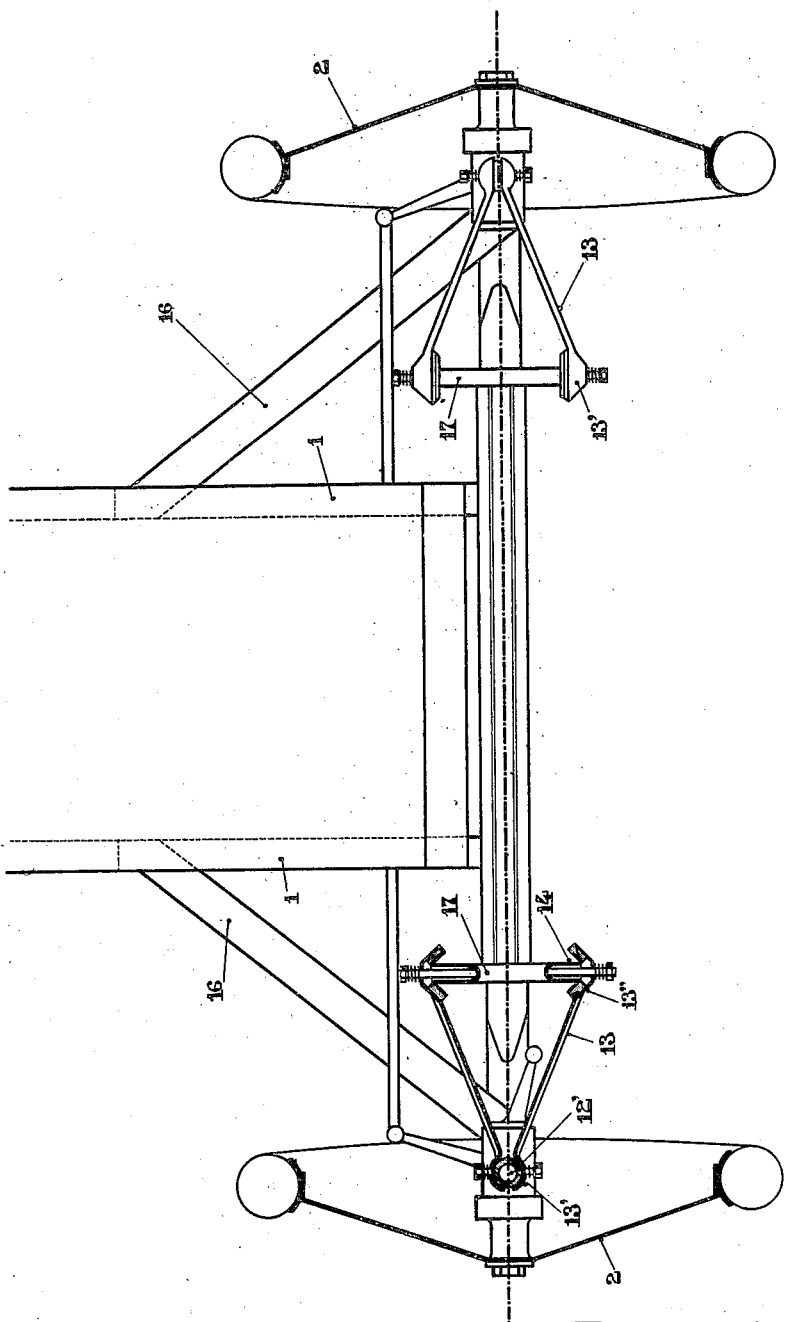

Patented July 6, 1926.

1,591,750

UNITED STATES PATENT OFFICE.

GUSTAVE DUMONT, OF NEUILLY SUR SEINE, FRANCE.

AUTOMOBILE CHASSIS.

Application filed November 14, 1922, Serial No. 600,950, and in France November 26, 1921.

The invention relates to improvements applicable to motor vehicles, the improvements consisting in a system of suspension of the chassis and the operation of the driving wheels and the steering wheels in combination with shock absorbers operated in a particular manner, the whole being arranged for the purpose of arranging the four wheels absolutely independently of one another, for obtaining great strength, and for improving the general conditions of suspension of the vehicle and its up-keep on the road and to permit of a simplified and light construction and an economic manufacture.

The invention will now be described with reference to the accompanying drawings wherein:—

Figure 3 shows an elevation of the two steering wheels, and

Figure 4 shows a corresponding plan.

Figure 2:
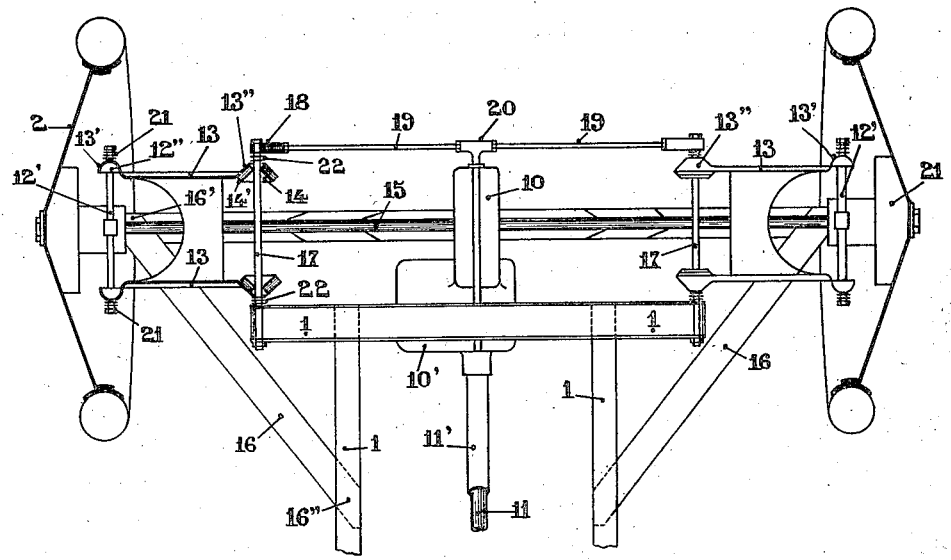
Figure 2 shows a corresponding plan.
Figure 1:
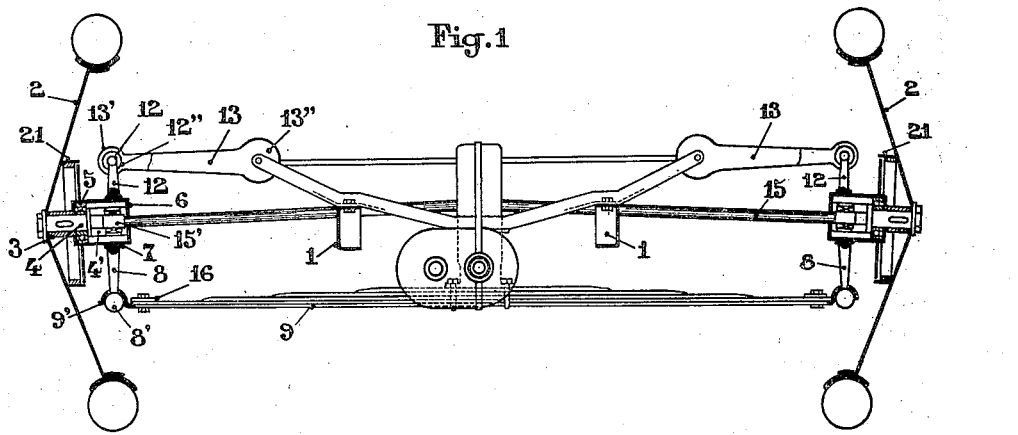
Figure 1 illustrates in elevation, partly in section, the arrangement of the two driving wheels.

In Figs. 1 and 2 the chassis of the vehicle is indicated at 1. The wheels, which in the example illustrated are of the disc type of sheet steel but which of course may be of any other suitable construction and movable or not, are indicated at 2.

The wheels are each mounted on a hub 3 keyed to an axle 4; this axle forming a part of a member 4' which forms one of the elements of a universal or similar joint. The whole of the axle 4, 4' is mounted in a casing 7 by means of a ball bearing 5 and a roller bearing 6, or only by means of ball bearings or roller bearings or even any ordinary bearings as may be desired.

The casing 7 is provided with a downwardly projecting arm 8 and an upwardly projecting arm 12.

The upper arm 12 supports a longitudinal rod 12' terminating in two hemispherical heads 12" and the lower arm 8 terminates in a spherical head 8'. Upon the heads 8' of the arms 8 of the casings 7 of the two wheels bear caps 9' which are formed at the ends of a transverse spring 9 either directly or indirectly secured at the middle to the chassis 1 of the vehicle.

The spring 9 may be secured in any suitable manner according to the general type of vehicle, either directly to the chassis 1 or as indicated in the example illustrated to a casing 10, 10' secured to the chassis and which contains the gearing for transmitting to the transverse shafts 15, hereinafter referred to, the movement of the motor shaft by means of the usual clutch and change speed mechanism.

In the example illustrated it has been assumed that the casing 10 is provided with a portion 10' containing the speed gear driven by the motor shaft 11 passing through a tube 11', but this arrangement may be varied according to the construction adopted, provided that the transmission by bevel gear or worm gearing contained in the casing 10 transmits the movement to two transverse shafts 15 by means of couplings of the universal type, or equivalent means which need not be described. By means of the connection of the ends 15' of the shafts 15 to the part 4' of the axle 4, 4' the wheels are suitably driven in the ordinary manner as is the case with the driving wheels fitted with shafts and transverse universal connection.

The invention is not limited to a particular type of coupling, as it is possible to employ universal joints, telescoping shafts and even flexible spherical couplings.

It will be understood that the suspension system may be provided with two transverse springs instead of the single transverse spring 9, these springs being either superposed or placed side by side, in which case the spherical caps 9' and the arms 8, 8' will be modified accordingly. For example, in the case of two superposed springs each pair of springs will be provided with a single spherical cap 9' secured to a member connecting together the ends of the springs; and in the case of two juxtaposed springs, two spherical caps will be provided at the adjacent ends of the springs and engage the two arms 8 8' integral with the casing 7 and suitably arranged.

To the ends of the transverse spring 9 are secured at 16' blades 16 which at their other end are secured at 16" to the chassis 1. These blades are adapted to transmit to the chassis the pushing or pulling efforts and are of sufficient flexibility to permit of the vibrating movements of the spring 9.

The shock absorber for each wheel consists of two arms 13 provided at one end with a hemispherical cap 13' adapted to engage with the heads 12" of the stub axle casing, thus forming a bearing device, whilst to the other end is secured a conical cap 13" which engages with a cone 14 provided with a friction surface 14'. It will be understood that this arrangement is capable of various modifications, for example the friction system formed by the cones 14 14' and 13" may be replaced by a system of members with spherical surfaces or even of an arrangement of flat discs. The length of the arm 13 and the position of the parts 13' and 13" are determined according to each type of vehicle for the purpose of insuring the vertical movement of the point of contact of the wheel with the ground.

The two cones 14 are keyed to a rod 17 secured at one end to the chassis 1, the other end of this rod being provided with a screwed sleeve 18 which receives a screwed rod 19 engaging at its other end in a sleeve 20 fixed to the casing 10 and consequently to the chassis 1.

These screwed rods 19 permit of accurately adjusting the parallel position of the two wheels, the two wheels and the suspension spring being sufficiently flexible to form and maintain this adjustment.

Springs 21 hold the caps 13' in contact with the heads 12'" and springs 22 apply the necessary pressure between the conical caps 13" and the friction cones 14, 14'. It will be understood that the rods 19 may be operated in a manner as to form an element insuring slight elasticity.

The wheels shown in Figures 3 and 4 are arranged in a similar manner, the only difference being that the casing 7 is provided with a single arm 12, with a spherical head 12' with which engage the two caps 13' of the two arms 13 of the shock absorber and that the rod 17 provided with the friction cones 14 is rigidly secured to the chassis 1 as in this case the device for adjusting the parallel position of the wheels is not necessary, the adjustment of the steering wheels being effected by the usual means.

The suspension and operating system for the wheels which has been described presents the advantage that only a very light weight is left unsuspended it being reduced to a minimum since it is limited to the weight of the wheels only.

Moreover, in view of the omission of a rigid axle or a bridge for the rear transmission, or a rigid axle for the front transmission, the wheels are independently movable of one another, which considerably facilitates rolling motion and the up-keep of the vehicle on the road, as each wheel can be raised independently of the others on encountering irregularities of the road surfaces. This avoids lateral frictional movements of the wheel on the road surface, which in the case of vehicles with rigid axles and bridges, is very noticeable, when, in consequence of irregularities in the road surface, an axle or bridge assumes a considerable inclined transverse position.

With the system forming the subject of the invention the wheel always remains in contact with the road surface without appreciably varying its track. The vehicle thus remains perfectly stable, steering is made easy and convenient, and there is a considerable economy in the wear of the tires.

It may be mentioned also that for the group of front wheels and the group of rear wheels, the combination of the spring 9 with the members 8 to 12 and the shock absorber arms 13 form an element of beam of great depth which particularly resists sudden efforts resulting from shocks to which the wheel may be exposed.

The invention is not strictly limited to the constructional forms and arrangements illustrated and it may be carried out with a number of modifications containing the essential features and combinations herein described by way of example.

Having thus described my invention what I claim as new and desire to secure by Letters Patent is:—

1. A suspension device for the wheels of automobile vehicles comprising, in combination, a chassis, a spring secured to the chassis, a bearing member on the spring, a casing, an axle mounted in the casing, a wheel mounted on the axle, a pair of arms secured to the casing, bearing members on the arms, a rod mounted on the chassis, bearing members secured to the rod, bearing members slidably arranged on the rod, means connecting the bearing members on one of the pair of arms to the bearing members slidably arranged on the rod, the bearing member on the other of the pair of arms coacting with the bearing member on the spring, and means for adjusting the position of the rod.

2. A suspension and control system for vehicle wheels, comprising, two wheel receiving bearing casings, two oppositely extending arms on each casing, a spring interconnecting one arm of each casing, and a shock absorbing means interconnecting the other arms of the casings, the spring, casings and arms, and shock absorbing means forming a unitary beam adapted to function as a connecting shaft for wheels mounted in the casings, said shock absorbing means including, rods, friction members resiliently held in contact on the rods, and rod members adjustably interconnecting the said rods.

3. A suspension and control system for vehicle wheels, comprising, two wheel receiving bearing casings, two oppositely extending arms on each casing, a spring interconnecting one arm of each casing, and a shock absorbing means interconnecting the other arms of the casings, the spring, casings and arms, and shock absorbing means forming a unitary beam adapted to function as a connecting shaft for wheels mounted in the casings, said shock absorbing means including, rods, friction members held on the rods, and rod members interconnecting the said rods, the rod members being formed for adjustable connection to a chassis.

4. A suspension and control system for vehicle wheels, comprising, two wheel receiving bearing casings, two oppositely extending arms on each casing, a spring interconnecting one arm of each casing, and a shock absorbing means interconnecting the other arms of the casings, the spring, casings and arms, and shock absorbing means forming a unitary beam adapted to function as a shaft for wheels mounted in the casings, said shock absorbing means including, rods, friction members resiliently held in contact on the rods, and means interconnecting the said rods.

5. A suspension and control system for vehicle wheels, comprising, two wheel receiving bearing casings, two oppositely extending arms on each casing, a spring, universal joints connecting the spring to one arm of each casing, a shock absorbing means, universal joints connecting the shock absorbing means to the other arms of the casings, the spring, casings and arms, and shock absorbing means forming a unitary beam functioning as a connecting shaft for wheels, mounted in the casings, the shock absorbing means including members spaced in a substantially horizontal plane, whereby to maintain the vertical stability of the unitary beam.

6. A suspension and control system for vehicle wheels, comprising, two wheel receiving bearing casings, two oppositely extending arms on each casing, a spring, universal joints connecting the spring to one arm of each casing, a shock absorbing means, universal joints connecting the shock absorbing means to the other arms of the casings, the spring, casings and arms, and shock absorbing means forming a unitary beam functioning as a connecting shaft for wheels mounted in the casings, the shock absorbing means including rod members forming a plane figure in a substantially horizontal plane, whereby to maintain the vertical stability of the unitary beam.

GUSTAVE DUMONT.